United States Patent Office 3,509,110
Patented Apr. 28, 1970

3,509,110
VINYL ARYL MONOMER-HALF ESTER COPOLYMERS BY SUSPENSION POLYMERIZATION
Adolph V. Di Giulio, Pittsburgh, and David R. Williams, North Apollo, Pa., assignors to Koppers Company, Inc., a corporation of Delaware
No Drawing. Filed Apr. 3, 1968, Ser. No. 718,347
Int. Cl. C08f *1/11, 19/10, 27/00*
U.S. Cl. 260—78.5                                    14 Claims

ABSTRACT OF THE DISCLOSURE

Non-equimolar copolymers of a vinyl aryl monomer such as styrene and a controlled amount of a half ester of an ethylenically unsaturated dicarboxylic acid, such as n-butyl hydrogen maleate are produced in bead form by a suspension polymerization process. The bead copolymers so produced are, by heating, readily cyclized to produce non-equimolar vinyl aryl monomer-anhydride copolymers having high heat deflection resistance.

Background of the invention

Copolymers of styrene and minor amounts of maleic anhydride have a superior heat deflection temperature than does homopolystyrene, the heat deflection resistance increasing with increasing maleic anhydride content. This enhanced heat deflection is a very useful and desirable property for thermoplastic or commercial polymers. However, because of the strong tendency of maleic anhydride to form 1:1 equimolar copolymers with other vinyl monomers, the preparation of non-equimolar, substantially homogeneous copolymers such as styrene and maleic anhydride copolymers poses problems.

In order to prepare low content, relatively homogeneous styrene-maleic anhydride copolymers, e.g., about 12 mole percent maleic anhydride content, the initial styrene to maleic anhydride feed ratio should be about 200/1, and this ratio of unpolymerized monomers should be maintained during the polymerization cycle. Thus, to produce a non-equimolar substantially homogeneous copolymer for example, of styrene and maleic anhydride, requires unusual techniques or specialized and sophisticated equipment. Heretofore, these copolymers have been prepared either by solution polymerization directly from the respective monomers, utilizing an incremental addition technique whereby the reactive monomer is continuously added during the polymerization such as described in U.S. Patent 2,971,939, or by a continuous recycle polymerization process such as described in U.S. Patents 2,769,804 and 1,989,517. Disadvantages are inherent in such solution polymerization processes. For example, in an incremental addition technique, the polymer must be isolated by precipitation, and in a continuous recycle copolymerization process, the polymer is obtained in a solution of styrene monomer from which the styrene monomer must be flashed distilled and recycled, thus incurring additional cost, and the danger of incorporating some homopolystyrene in the copolymer product. The latter process also involves the use of rather sophisticated equipment. In addition, it is difficult to obtain high molecular weight ($\overline{M}n > 100,000$) copolymers at reasonable rates of polymerization in such a process.

Another approach to the problem of preparing non-equimolar cyclic anhydride copolymers (and other copolymers containing cyclic rings) involves the preparation of copolymers which can be readily converted to the cyclic anhydride functionality (or other cyclic structures such as imide or N-substituted imide, lactone, lactams, and the like). Such copolymers contain difunctionalities such as dicarboxyl, or acid-ester, acid-amide, hydroxyl-acid (or ester), amino-acid (or ester), dihydroxyl, and the like. Thus, styrene-co-maleic acid or styrene-co-fumaric acid copolymers, if prepared, can readily be cyclized to styrene-maleic anhydride copolymers. However, the solubility of maleic acid and fumaric acid in monomers such as styrene is negligible. Hence, solution or emulsion-type copolymerizations may be practical, but bulk or suspension-type copolymerizations are impractical.

By converting one of the carboxyl groups of a diacid to an ester functionality, the resulting half ester (or acid) attains considerable solubility in aryl vinyl monomers such as styrene. The advantage in using such comonomers as the diacids or half acids resides in the fact that the reactivity ratios with such comonomers as styrene are considerably less restrictive for preparing other than 1:1 styrene copolymers. Whereas the diacids are generally too insoluble in the vinyl monomer to be effectively used in an aqueous suspension system, the half esters possess the desirable features of proper reactivity and solubility, but have two important drawbacks: the half esters (1) disproportionate to the diacid and diester, especially at polymerization temperatures, and adversely effect the suspension copolymerization of relatively water-insoluble half acid monomers and (2) are hydrolytically unstable. These two factors severely restrict the amount of the initial half ester that can be used in a suspension copolymerization. Because of the varying solubility of different half esters in the aqueous phase, the amount of half ester available for polymerization in a given system will vary. Thus, due to the disproportionation and solubility characteristics of the half ester, the amount of half ester incorporated into the vinyl aryl monomer phase is drastically reduced from that initially added to the system, and only a minor portion of the initially added half ester will be incorporated in the resulting copolymer.

We have now found that, although the hydrolytic instability of water soluble half esters generally preclude their use in a practical suspension polymerization process, the equilibrium phenomena between an ethylenically unsaturated dicarboxylic acid, an alcohol, and the resulting half ester in an aqueous system can be used to produce non-equimolar homogeneous or non-homogeneous vinyl aryl-half ester copolymers of a predetermined half ester content.

Thus, although the addition of a half ester to a vinyl aryl monomer aqueous suspension system generally results in hydrolysis of some of the half ester into a diacid and an alcohol in a 1:1 ratio, the equilibration which occurs is quite restrictive; whereas, we have found that by proper use and control of an equilibrating aqueous mixture of an ethylenically unsaturated dicarboxylic half ester, dicarboxylic acid, and an alcohol, excellent control, versatility and flexibility of the system for preparing non-equimolar vinyl aryl copolymers is achieved.

These copolymers are useful precursors for the preparation of other desirable polymers such as the half amides, diamides, imides, and salts. In addition, such copolymers are readily converted to useful cross-linked materials.

Summary of the invention

It has now been discovered that copolymers comprising a major portion of a vinyl aryl monomer and a minor portion of a controlled amount of a half ester of an ethylenically unsaturated dicarboxylic acid can be produced in bead form in an aqueous suspension system.

The aqueous phase of the system is composed of an equilibrating mixture of an alcohol (or mixtures of alcohols), ethylenically unsaturated dicarboxylic acid and an ethylenically unsaturated half ester (both of the latter of which may be derived from the respective anhydride). The oil phase of the system is composed of the vinyl aryl monomer, free radical initiator and half ester. The initial half ester is preferably formed in the aqueous phase and partitions itself between the two phases after the vinyl aryl monomer has been added. The system is suspended with the use of stabilizing agents or protective colloids. Prior to the time the reaction mixture is at the desired polymerization temperature, and during the polymerization cycle, the half ester partitions itself between the oil phase and the aqueous phase. As polymerization proceeds in the oil phase (thus consuming half ester), half ester diffuses from the aqueous phase into the oil phase. Thus, the aqueous phase serves as a reservoir for forming the half ester (in situ) as well as for feeding the half ester into the polymerizing phase. The equilibrating mixture obtained in the aqueous phase, as well as in the polymerizing phase, is affected by the reaction parameters such as temperature and the concentration of the various reagents and hence, will affect the amount of comonomers incorporated in the resulting copolymer.

The homogeneity of the copolymer can be controlled by varying the reaction parameters so that a desired balance (obtained empirically) among the various simultaneously occurring reactions, such as the rate of formation of half ester, the partition of half ester between the two phases and the rate of depletion of the aryl vinyl monomer, is obtained. In order to obtain substantially homogeneous copolymers, the ratio of unpolymerized aryl vinyl monomer and half ester in the polymerizing phase must be maintained relatively constant. Thus, half ester must diffuse into the polymerizing phase at a constantly decreasing rate commensurate with the rate of decrease (or depletion) of the aryl vinyl monomer. According to one embodiment of the invention, the homogeneity of the desired copolymer can be controlled by initiation of polymerization after a predetermined amount of half ester has been formed.

In batchwise copolymerization reactions, a minor amount of ethylenically unsaturated carboxylic compounds (diacid and half ester) is actually utilized, the major portion thereof remaining unpolymerized in the aqueous phase, predominantly in the "cis" form. This aqueous phase, containing the unutilized unsaturated carboxylic compounds and alcohol, is recycled with a predetermined amount of additional alcohol, aryl vinyl monomer and ethylenically unsaturated acids (diacid, half ester, or both) to produce additional copolymer.

The half ester copolymers prepared by the above process have glass transition temperatures substantially greater than that of the aryl vinyl homopolymer. The aryl vinyl monomer-half ester bead copolymers may be partially cyclized by heating to produce the interpolymers of aryl vinyl monomers, half ester, and cyclic anhydride or they may be completely cyclized to cyclic anhydride-aryl vinyl monomer copolymers.

Detailed description

The copolymers prepared by the process of the present invention comprise a major portion, that is greater than 50 mole percent, of an aryl vinyl monomer. The aryl vinyl monomers useful in the present invention include styrene, ortho-methylstyrene, meta-methylstyrene, para-methylstyrene, ethylstyrene, dimethylstyrene, divinylbenzene, alpha-methylstyrene, para-methoxystyrene, para-chlorostyrene, 2,4-dichlorostyrene, 2,5-dichlorostyrene, parabromostyrene, alpha-methyl-p-methylstyrene, para-isopropylstyrene, vinylnaphthalene and the like. Mixtures of two or more of these aryl vinyl monomers may be used if desired.

The minor portion of the copolymers is formed from a half ester of an ethylenically unsaturated dicarboxylic acid which is relatively water soluble such as maleic acid, fumaric acid, itaconic acid, citraconic acid, mesaconic acid, ethyl maleic acid, methyl itaconic acid, chloromaleic acid, dichloro-maleic acid, bromomaleic acid, dibromomaleic acid and the like.

The half esters are formed from the ethylenically unsaturated dicarboxylic acid or its anhydride (or mixtures of the same) and the desired alcohol. Suitable alcohols are the primary and secondary alkanols containing up to 6 carbon atoms, such as methyl alcohol, ethyl alcohol, n-propyl alcohol, n-butyl alcohol, sec-butyl alcohol and n-pentyl alcohol; halogenated alkanols having up to 6 carbon atoms, such as 2,3-dichloro-1-propanol and 2-bromo-1-propanol; arylakyl alcohols such as benzyl alcohol; cyclic alcohols having up to 6 carbon atmos, such as cyclopentanol, cyclohexanol and tetrahydrofurfuryl alcohol; ether alcohols such as 2-butoxy ethanol and the ethyl ether of diethylene glycol; phosphorous containing alcohols such as diethyl monobutanol phosphate; nitrogen containing alcohols such as N,N-dimethyl ethanol amine, and the like. A controlled degree of cross-linking of the copolymers can be achieved by the use of difunctional alcohols such as allyl alcohol, ethylene glycol, 1,4-dihydroxymethyl cyclohexane and the like, or mixtures of these with the above-mentioned alcohols.

By the selection of the appropriate alcohol used to form the half ester, it is possible to prepare the half esters with a varying degree of solubility in the aqueous and the aryl vinyl monomer phases of the polymerization mixture. Generally speaking, increasing the number of carbon atoms in the alcohol will increase the solubility of the derived half ester in the aryl vinyl monomer phase (oil phase) and correspondingly decrease its solubility in the aqueous phase. Thus, depending upon the alcohol utilized, the amount of half ester incorporated (on a mole basis) into the final copolymer may be increased or decreased.

In addition, with a given alcohol, the amount of half ester incorporated into the copolymer may be increased or decreased as desired. This is determined by the reaction parameters and conditions such as concentration, reaction temperature, and rates of polymerization. The process of the present invention is quite flexible and versatile and enables the production of various aryl vinyl-half ester, non-equimolar copolymers covering a wide range of compositions.

When higher alcohols such as n-butanol or amyl alcohol are used, there may be a minor amount of solubilization of the diacid moiety into the oil phase resulting in a minute amount of diacid being incorporated into the polymer. However, such minute amounts of diacid also cyclize to the anhydride and produce aryl vinyl-anhydride copolymers.

The polymers formed are non-equimolar. This term indicates that the reactants do not react in a 1:1 molar ration as is generally the case with aryl vinyl monomers and ethylenically unsaturated carboxylic compounds. This is possible because of the favorable reactivity ratios prevailing in the half ester-aryl vinyl monomer system, and also because of the unique solubility characteristic of the half esters in the two phases. The combination of these two factors enables the system to be adjusted so as to maintain in the polymerizing phase, an aryl vinyl monomer-half ester monomer ratio such that other than 1:1 copolymers are formed.

To produce homogeneous copolymers it is necessary to maintain a substantially constant ratio of the polymerizing monomers during the polymerization cycle. Homogeneous, non-equimolar, styrene-maleic anhydride copolymers, for example, are difficult to prepare due to two factors: (a) initially very high styrene-maleic anhydride ratios are required in order for the inital copolymer to be other than 1:1, and (b) the maleic anhydride is consumed so rapidly, relative to styrene, during the polymerization that the styrene-maleic anhydride monomer ratio changes dramatically in short order, so that there is a considerable drift in the composition of the resulting copolymer.

The process for the present invention is such that the conditions necessary for obtaining non-equimolar, homogeneous aryl vinyl monomers-half ester (capable of being converted to anhydride) copolymers may be reasonably attained. For example, the initial styrene-half ester feed ratio necessary to produce about an 8 mole percent half ester in the initial copolymer is only about 20 to 1. In addition, the variance of the copolymer composition and in the ratio of unpolymerized monomers is quite gradual with conversion for the monomer feed ratios required to produce initial low content (non-equimolar) half acid copolymers. The present process makes use of the favorable reactivity ratios prevailing for the aryl vinyl monomer-half ester system and the unique solubility and diffusion characteristics of the various half esters in a system composed of a vinyl aryl monomer phase and an aqueous phase. The present invention makes use of the mobile equilibrium prevailing in an aqueous phase composed of water, diacid, half ester and alcohol, by which means half ester is formed in situ and also fed into the polymerizing suspended phase in such a manner and at such a rate so that the ratio of polymerizing monomers does not vary drastically during the whole of the polymerization cycle. This results in substantially homogeneous copolymers, and enables essentially the complete utilization of vinyl aryl monomer. The aqueous phase serves a two-fold function (in addition to its regular role in suspension systems). The aqueous phase serves as a source for forming half ester in situ and serves the function of incrementally feeding the more reactive monomer to the polymerizing phase until the vinyl aryl monomer is essentially depleted.

To produce homogeneous copolymers according to the present process, it is imperative that a sufficient amount of half ester be initially present in the vinyl aryl monomer phase before polymerization is initiated, and that the composition of the aqueous phase be such that it is capable of maintaining a reasonably constant ratio of the comonomers during the polymerization cycle. Thus, although the half ester may be formed in situ, sufficient reaction between the alcohol and the anhydride or acid must be carried out and a sufficient amount of the half ester must be allowed to partition itself between the two phases before polymerization is initiated. Then, the polymerization is effected at such a rate so that the constantly shifting concentration of half ester in the aqueous phase and the constantly shifting diffusion rate of the half ester into the polymerizing phase parallels the constantly decreasing aryl vinyl monomer concentration, enabling the maintenance of a relatively constant ratio of monomers during the polymerization cycle.

Although, theoretically, the system is complex, in practice it is relatively simple to determine the conditions for preparing substantially homogeneous copolymers of various half ester content for a given alcohol system.

The initial half ester content in the aqueous phase is readily determined by finding the milliequivalents (meqs.) of base necessary for neutralization. The initial half ester content can be varied from practically nil to quite high concentrations by controlling the mode of addition. For example, by adding an ethylenically unsaturated anhydride and water initially until solution is complete, followed by the alcohol addition with a temperature being maintained at about 30 to 35° C., and allowing little time for equilibration, there is very little or no half ester content prior to the addition of the aryl vinyl monomer. Thus, if the reactants are quickly brought up to polymerization conditions (about 0.5 to 1.0 hours) for example, by raising the temperature (which will accelerate the rata of equilibration) to about 70–130° C. and carrying out the polymerization so that the aryl vinyl monomer is essentially depleted in about 8 to 24 hours, the intial copolymer will be low in half ester content. However, the half ester content of the copolymers gradually increases with increasing conversion. This results because the half ester content in the aqueous phase initially is low, and the amount which diffuses into the aryl vinyl monomer phase by the time polymerization is initiated is also quite low. However, as the polymerization proceeds, the half ester content of the system increases, the degree of such increase depending upon the shifting equilibrium of the system. This, coupled with the decrease in the vinyl monomer concentration, results in the initially low and subsequently higher half ester content in the copolymer.

Alternatively, if the anhydride and alcohol are initially reacted, the initial half ester content of the aqueous solution can be varied from very low to very high depending upon the concentration of other reactants and the temperature and reaction time allowed for half ester formation prior to the addition of the other reactants. For example, reactions with a given alcohol where all of the parameters are kept constant, except the amount of half ester initially present in the aqueous phase at about 30° C. (the starting anhydride and alcohol concentration also being kept constant), the composition of the copolymers depending upon the degree of conversion can be varied in a number of ways, including the following:

(a) Where the initial half ester content is very low, the initial copolymer will be very low in half ester content, but the half ester content of the copolymer will increase with increasing conversion until the aryl vinyl monomer is depleted;

(b) Where the initial half ester content is very high, the reverse situation of (a) will prevail, that is the half ester content of the initial copolymer will be quite high and the half ester content will gradually decrease with increasing conversion, (c) Where the initial half acid content lies somewhere between the above extremes, somewhere between (a) and (b), a certain initial half ester content in the aqueous phase will produce copolymers of substantial homogeneity.

Surprisingly, after a few quantitative experiments, the conditions needed for forming substantially homogeneous copolymers can be readily established. The initial half ester content can be varied by a number of methods; for example, (1) Where the mode of addition of reactants leads to a low half ester content, the system can be allowed to equilibrate to a higher half acid content by allowing it to set for a longer period of time, by heating and then bringing the temperature down to about 30 to 35° C. or, by use of a catalyst to speed up the equilibration.

(2) Where the mode of addition of reactants lead to initially high half ester content, the system can be allowed to equilibrate to a lower half ester content by allowing the system to set for a longer period of time or by heating and then bringing the temperature down to about 30–35° C., or by use of a catalyst to speed up the equilibration.

It is not to be inferred that the desirable initial half acid content of the aqueous phase, at about 30–35° C., is that amount of half acid which prevails at equilibrium, although this may be the case in some systems.

(3) Some pre-formed half ester may be added to the aqueous solution of diacid, alcohol and water to obtain the desired concentration.

(4) Some pure half ester may be added initially to the aryl vinyl monomer phase.

(5) Some pure half ester may be added initially to the aryl vinyl monomer phase and aqueous phase.

(6) Water and pure half ester can be added initially and increments of pure half ester (or anhydride or diacid and alcohol) added during the course of the reaction.

At times, it is advantageous to allow the aqueous solution (or at times the whole system) whether starting with high or low initial half ester content, to equilibrate at the polymerization temperature before initiating polymerization. Thus, numerous modifications are possible for obtaining the desired half ester content in the system in order to produce relatively homogeneous products.

In systems where conditions would ordinarily allow a gradual increase in half ester content, incremental addition of aryl vinyl monomer during the later stages will modify the tendency to non-homogeneity and produce a more homogeneous product.

In systems where conditions would ordinarily allow a gradual increase in half ester content, incremental addition of pure half ester (or carboxyl species and alcohol) during the course of the polymerization will modify the copolymerization so as to produce a more homogeneous product.

In essence, the homogeneity of the product depends upon the maintenance of a reasonably constant ratio of polymerizing monomers during the polymerization cycle. Hence, at times it may be advantageous to slow down or speed up the polymerization rate to parallel the concentration parameters.

The versatility and flexibility of the process of this invention which will produce half ester copolymers of varying half ester content, becomes quite evident in the case of the higher alcohols such as n-butanol, amyl or benzyl alcohol. The use of such higher alcohols (versus methanol, for example, results in a higher half ester content (on a mole basis) in the resulting copolymer. This is probably due to the increased solubility of the resulting half ester into the polymerizing monomer-polymer phase. Thus for example, when n-butanol is the alcohol, copolymers ranging from 1 to 15 mole percent half ester are readily obtained, and higher content half ester copolymers may be obtained if desired, up to about 25% or the like. The half ester content of the copolymers in such a system can be varied over a wide range simply by varying the concentration parameters. For example, for a given system, where the initiator vinyl aryl monomer, water content and polymerization cycle are kept constant, varying amounts of half ester can be incorporated into the copolymer product, by varying either the carboxylic moiety or alcohol individually, or both simultaneously. Increasing the carboxylic moiety in the recipe, for example, while maintaining a constant polymerization cycle and all of the other reactants constant, causes an increase in the half ester content of the resulting copolymer. When only the alcohol is varied, similar results are obtained. Also similar results are obtained by just varying the water content in the recipe. Similarly, varying the vinyl aryl monomer content of the recipe produces similar results.

The polymerization is effected by any of the well-known initiators for free radical polymerizations that decompose within the temperature range used in the present polymerization process. Such free radical forming polymerization catalysts include the peroxide or azo-type polymerization catalyst. Suitable peroxide catalysts include benzoyl peroxide, acetyl peroxide, di-tertiary-butyl peroxide, cumene hydroperoxide and for example, those taught in U.S. 3,036,053, and the like. Suitable azo catalysts include alpha- alpha'-azodiisobutyronitrile or azo-($\alpha$-cyano)-valeric acid and the like, well known in the art of polymerization. These catalysts are normally present in an amount of 0.05 to 0.5% by weight of the aryl vinyl monomer present in the polymerization system.

Suitable temperatures for the polymerization reactions are in the order of 40 to 150° C. and with a temperature between 50 and 130° C. being preferred. Generally, autogeneous pressures are employed in the process, but, of course, the process can be carried out at atmospheric pressure or under superatmospheric pressures. Reaction time is, of course, dependent upon the temperature and the amount of catalyst used.

Known suspension stabilizers are usable in the present suspension polymerization process. Examples of such suspending agents are polyvinyl alcohol, polyacrylic acid, various Gantrez resins (vinyl ether-maleic anhydride copolymers), polymaleic acid, polyacrylamide resins, water soluble soaps, water soluble interpolymer salts and the like. Solid suspending agents which are acid insoluble are also usable, such as bentonite, silica, aluminum oxide, calcium fluoride and the like. The stabilizers, which are capable of acting as a stabilizer under acidic conditions such as those present in the process of the present invention, are used in an amount of 0.01 to 0.5 percent by weight of the water present in the system.

Expandable aryl vinyl monomer copolymers may be prepared according to the present process by carrying out the polymerization in the presence of expanding agents. Preferably, the expanding agents are mixed with the monomers prior to the initiation of the polymerization. These expansion agents, such as lower aliphatic hydrocarbons, cyclic hydrocarbons, halohydrocarbons, or even water itself, are known in the art and are normally added in amounts of 3–12% by weight of monomers.

The polymerization may be carried out in the presence of various other additives such as plasticizers, dyes or flame retardant compounds as in the case in general aryl vinyl monomer polymerizations.

The aqueous filtrate, following separation of the copolymer beads, may be utilized for the preparation of additional copolymer. If the same copolymer product as initially prepared with the original recipe is desired, then the aqueous filtrate is upgraded with additional half ester (preformed or formed in situ), alcohol, water and dicarboxylic species to obtain the initial concentrations prevailing in the original recipe. Surprisingly, in preparing styrene-maleic copolymers, the acidic species in the aqueous filtrate is essentially maleic acid and the half ester and their concentration in the aqueous phase is easily determined. There is little or no isomerization to fumaric acid in this system. The desired amount of additional half ester may simply be prepared (in the reactor if desired) by reacting the required amount of maleic anhydride and alcohol. After the aqueous filtrate has been appropriately upgraded, the polymerization is effected utilizing the same monomer and catalyst concentrations and reaction conditions (if preparing the same copolymer) as utilized in the original reaction. Generally, when the aqueous filtrate is recycled, considerably less suspending agent may be needed for maintaining successful suspension.

The bead product is a copolymer of an aryl vinyl monomer and a half ester. In cases where large amounts of alcohol are used, small amounts of diester may be incorporated into the product along with the half ester. This bead product, which has incorporated therein a predetermined amount of the half ester, has a glass temperature higher than that of homopolystyrene. Of course, mixtures or blends of a homopolymer of vinyl aryl monomer and the copolymers of the present invention can be formed by first polymerizing vinyl aryl monomers in suspension and then carrying out the process of the present invention with the homopolymer as part of the vinyl aryl monomer phase.

The aryl vinyl monomer-half ester copolymers are readily cyclized to yield aryl vinyl monomer-anhydride copolymers. The term "cyclize" as used herein refers to the formation of a cyclic anhydride group from the oxygen-containing groups of the ethylenically unsaturated half ester or dicarboxylic acid present in the copolymer. The copolymers can easily be cyclized by heating in solution, bulk or suspension. A preferred method is by heating under reduced pressure. This is accomplished in appropriate vacuum equipment, such as ovens or devolatilizing extruders. The alcohol which is a by-product of the cyclization may be readily recovered.

Temperatures employed during the cyclization are generally in the order or 200° C., but can vary widely, since the rate of cyclization is temperature dependent. The extent of cyclization is readily determined by either chemical or physical means. Infra-red analysis is especially useful, since it will clearly indicate the generation of cyclic anhydride functionality and the disappearance of ester and acid functionalities.

By cyclizing these copolymers, it is possible to prepare non-equimolar aryl vinyl monomer-anhydride copolymers having a predetermined amount of anhydride component.

The cyclization behavior may be modified somewhat when branched alcohols are used in the preparation of the half-acid copolymer. In order for the cyclization to anhydride to occur, the carboxyl and ester groups must have, or be able to attain, a favorable "cis" conformation. This must involve rotation around a carbon-carbon bond for some of the conformations of these groups ("gauche" or "skew" and "trans" or "anti") actually obtained in the copolymer product. Where little or no steric hindrance to rotation around the carbon-carbon bond holding these two groups is present, conversion to cyclic anhydride can be complete. However, branching in the alcohol can modify this behavior, by introducing a certain amount of steric restriction to rotation around the carbon-carbon bond for some of the conformations and in these instances, conversion to cyclic anhydride may be incomplete on heating. These residual carboxyl and ester groups may then be available for intermolecular reactions such as linear anhydride formation (cross-linking).

These aryl vinyl-anhydride copolymers (for example, styrene-maleic) and their half ester copolymer precursors because of the method of preparation are stereoisomerically different from aryl vinyl monomer anhydride copolymers (and their half acid derivatives) which are prepared directly from the aryl vinyl monomer and the anhydride.

In the examples hereafter described, the physical properties were determined by known procedures. The relative viscosity, $\eta_{rel}$, was determined in methyl ethyl ketone at 30° C. at 0.1% concentration. The inherent viscosity, $\eta_{inh}$, was then calculated from the relative viscosity. The number average molecular weight, $\overline{M}n$, was determined by membrane osmometry in methyl ethyl ketone at 37° C. The glass temperature, Tg, was determined by differential thermal analysis and the heat distortion temperature, HDT, determined, under load, by the procedure of ASTM D-648 using either ⅛" compression molded bars, or ½" injection molded bars, as indicated.

The invention is further illustrated by the following examples.

EXAMPLE I

To a nitrogen purged 2-liter resin kettle, equipped with stirrer, thermometer, reflux condenser, nitrogen inlet and addition funnel was added 120 g. (1.22 mole) maleic anhydride and 103.2 g. (3.23 mole) of methanol. The mixture was warmed for 10 minutes (40–45° C.) until all of the maleic anhydride dissolved. To the solution was added 600 g. of water, followed by 480 g. (4.62 mole) styrene containing 0.72 g. benzoyl peroxide. The mixture was stirred for 10 minutes (30–34° C.) and 1.0 ml. of 5% aqueous solution of Elvanol 50–42 added. Heating was commensed, with stirring maintained at ca. 400–500 r.p.m. The temperature was raised to 80° C. during 30 minutes, and then to 88° C. (reflux) during an additional 15 minutes. The mixture was refluxed for 11 hours and 0.30 g. of additional benzoyl peroxide was added. Reflux was continued with the total reaction time being 17 hours. Portions of a 5% aqueous Elvanol solution (1.37 ml.) were added at intervals during the reaction as follows: each 0.5 hour period during the 3.5–5.5 hour period; each 0.25 hour during the 5.5–7.5 hour period and each 0.5 hour period during the 7.5–9.0 hour period. The total amount of Elvanol solution added was ca. 19 mls. A sample of product, (26.3 g.) taken after 2.5 hours reaction time, was removed and coagulated in methanol. The coagulated polymer was dissolved in methyl ethyl ketone, precipitated by addition to methanol, filtered and dried. Infrared analysis showed ester carbonyl and acid carbonyl present in the product and titration showed the product to contain 4.7 weight percent methyl hydrogen maleate. The final reaction mass, after 17 hours reaction time, was cooled to room temperature and comprised beads and free mother liquor. A weight balance prior to work-up showed 39 g. of starting material was lost. The beads were filtered and leached twice with hot water (331 g. and 232 g. portions). The beads were thoroughly washed with methanol and vaccum dried for ca. 17 hours (94–104° C./0.6 mm.), to give 480 g. of styrene copolymer. A sample, removed and identified by infra-red, showed that it was the same as the sample removed at 2.5 hour reaction time, except for slightly stronger ester and acid carbonyl absorption. The half acid content of the copolymer was 5.5 weight percent half acid, by titration. The aqueous filtrate, 695 g. required 1344 meqs. of base for neutralization.

Two hundred grams of the above styrene-half acid copolymer was heated in an evacuated oven at 200° C. for 2.5 hours. The light-colored product, 193.5 grams, was analyzed by infra-red and showed absence of acid carbonyl absorption, and the presence of a weak ester carbonyl absorption with strong cyclic anhydride absorption. This indicated that a very small amount of dimethyl ester was present in the polymer. The anhydride content of the polymer was 3.9 weight percent. The polymer had a heat distortion temperature of 212.3° F. (⅛" bar). Thirty grams of this cyclized product was dissolved in methyl ethyl ketone, filtered and precipitated into methanol to give 29.1 grams of white fibrous polymer. The purified polymer had an anhydride content of 3.8 weight percent, $\eta_{inh}$=0.68, $\overline{M}n$=158,000, and a glass temperature, Tg=112° C. The infra-red spectrum was essentially identical to the spectrum of the unpurified polymer.

EXAMPLE II

The polymerization of Example I was repeated except that 0.36 g. of tert-butyl perbenzoate (in 3 ml. of styrene) was added after 8 hours reaction time. A weight balance prior to work-up showed that 27 grams of starting material was lost. The first hot water leach, 319 ml., required 121 meqs. of base, and the second leach required 12 meqs. of base, for neutralization. The aqueous filtrate required 1240 meqs. of base for neutralization. The copolymer, 506 grams was recovered in bead form and had a half acid content of 6.2 weight percent.

Two hundred grams of the above polymer was cyclized to yield 194.8 g. of light-ivory polymer with an anhydride content of 4.5 weight percent, having a heat distortion temperature of 212° F. (⅛" bar). Purified cyclized product had the following properties:

Anhydride content—4.3%
$\eta_{inh}$—0.53
$\overline{M}n$—128,000
Tg—112.5° C.

EXAMPLE III

A polymerization was carried out generally according to the procedure of Example I. The aqueous filtrate was recovered. Analysis of the filtrate showed that 594 g. contained approximately 31.5 g. of methyl hydrogen maleate, 52.4 g. of maleic acid and about 60 g. of methanol. A two-liter resin kettle was charged with the 594 g. of the above filtrate, 47 g. of methanol, 53 g. of maleic anhydride, and 89 g. of water. The reaction mixture was stirred for 10 minutes and an aliquot was titrated and showed that the solution would require 2.56 meqs. of base per gram or 1993 meqs. total for neutralization. To the reaction mixture, there was added 480 g. of styrene, and the mixture stirred for 6 hours and allowed to stand overnight. Titration then showed that 2.50 meqs. of base per gram of aqueous phase would be necessary for neturalization. Benzoyl peroxide, 0.96 g. was added along with 0.6 ml. of 5% polyvinyl alcohol solution and the polymerization carried out as in Example I, except that only a total of 6.6 ml. of polyvinyl alcohol solution was required to maintain a suspension throughout the reaction (1 ml.

increments added at 1.25 hr., 1.75 hr., 5.0 hr., 5.75 hr., and 6.25 hr.). Additional benzoyl peroxide (0.38 g.) was added after 5.5 hr. reaction time. The total reaction time was 13.5 hours. A sample of the reaction mixture which had been recovered at 2.5 hour reaction time showed a methyl hydrogen maleate content of 4.6 weight percent. Weight balance prior to work-up indicated that 21 g. of starting material was lost during the reaction. The bead product (479 g.) was recovered by filtration along with 621 g. of filtrate. A sample of the beads was shown to contain 5.8 weight percent of the methyl half acid. Two hundred grams of the bead product was cyclized generally as described in Example I to give 192.6 g. of light-yellow product having a maleic anhydride content of 4.6 weight percent and an HDT of 214° F. (⅛" bar). Purified copolymer had the following properties:

Anhydride content—4.5%
$\eta_{inh}$—0.44
$\overline{M}_n$—124,000

EXAMPLE IV

To a 2-liter resin kettle was charged 159.24 g. (1.224 mole) of methyl hydrogen maleate, 23.60 g. (0.74 mole) methanol and 600 g. water. The mixture was stirred at ambient temperature for 20 minutes (titration of an aliquot showed that 1.6 meqs. of base per gram of aqueous solution would be needed to neutralize the solution). Then, 480 g. of styrene were added and the solution stirred for 6 hours and allowed to stand overnight (10 hours). An aliquot of the aqueous phase, on titration, showed that 1.65 meqs. of base per gram of aqueous phase would be needed to neutralize the aqueous phase. Benzoyl peroxide (0.96 g.) and 5% polyvinyl alcohol solution (0.6 ml.) were added and the reaction mixture stirred and heated to 89° C. Additional benzoyl peroxide (0.38 g.) was added at 5.5 hour reaction time and additional polyvinyl alcohol solution was added at 3 hour (1.0 ml.), 4.5 hour, (1.0 ml.) and 5.5 hour, (5.0 ml.). Total reaction time was 15.5 hours with a final temperature of 91° C. A sample removed after 2.4 hour reaction time, showed 4.6 weight percent methyl hydrogen maleate in the polymer. A weight balance prior to work-up showed a loss of 30 g. during reaction. A bead product, 493 g. was recovered by filtration. (Filtrate, 599 g. required 1387 meqs. of base.) The beads analyzed for 5.6 weight percent methyl half acid. Two hundred grams of the bead product were cyclized to give 193.7 g. of transparent polymer having an anhydride content of 4.4% and an HDT of 211° F. (⅛" bare).

EXAMPLE V

To a nitrogen purged 10 gal. reactor was charged 5.06 lbs. maleic anhydride and 4.33 lbs. methanol. The mixture was warmed at 40–45° C. until the maleic anhydride dissolved. The solution was cooled to room temperature and 24.30 lbs. of water, 20.25 lbs. of styrene (containing 13.8 g. benzoyl peroxide) and 23 ml. of 5% polyvinyl alcohol solution were added. The reaction mixture was agitated two hours and heated. The following time-temperature-pressure cycle with continued agitation was used: 0.5 hour to 88–90° C. at 0–4.0 p.s.i.g.; 6.5 hour at 88° C. and 4.0–2.0 p.s.ig.; 11.5 hours at 90° C. and 2.0 p.s.i.g. Additional polyvinyl alcohol solution, 540 ml. was added incrementally during the 3–8 hours reaction period. At 10.5 hours, additional benzoyl peroxide (5.75 g. in 25 ml. styrene) was added. Samples of the reaction mixture were removed at hourly intervals, the polymer coagulated, dissolved in methyl ethyl ketone and precipitated into methanol and analyzed for methyl half acid content (see Table I). Infra-red spectra of these samples were also recorded and showed only a very slight variation in the composition of the respective sample, with the extent of conversion, verifying the titrometic data. The product, bead polymer was filtered and washed with hot water and methanol and dried to give 20.3 lbs. of product. The mother liquor (aqueous filtrate), 24.85 lbs. was analyzed and was shown to contain 2.95 lbs. of methanol, 19.06 lbs. of water, with methyl hydrogen maleate and maleic acid present equivalent to about 2.84 lbs. of meleic anhydride.

EXAMPLE VI

To a nitrogen purged 10 gal. reactor was charged 2.25 lbs. of maleic anhydride and 1.60 lbs. of methanol. The mixture was warmed at 40–45° C. until a solution formed. The solution was cooled to room temperature and 24.6 lbs. of the motor liquor (aqueous filtrate) from Example V was added, and the mixture agitated for 2 hours. There were then added 23 ml. of 5% polyvinyl alcohol solution and 20.25 lbs. of styrene containing 13.8 g. of benzoyl peroxide. The polymerization reaction cycle of Example V was repeated (only 510 ml. of polyvinyl alcohol solution added). There resulted 20.12 lbs. of bead product and 28.85 lbs. of aqueous filtrate. The samples removed at intervals were analyzed for half acid content. The results are tabulated in Table I. Infra-red analysis confirmed these results.

Three grams of the half ester copolymer were converted to the sodium salt by titration with sodium methoxide in dry pyridine. The solvent was evaporated and the residue continuously extracted with boiling toluene. Evaporation of the toluene extracts to dryness resulted in the recovery of 36 mg. (1.2%) of material. The infra-red spectrum of a film prepared from this residue showed cyclic anhydride carbonyl and some ester carbonyl absorptions. Thus, this material was also copolymeric or terpolymeric material, and there was essentially *no* homopolystyrene in the product.

EXAMPLE VII

To a nitrogen purged 10 gal. reactor was charged 5.06 lbs. of maleic anhydride and 4.33 lbs. methanol. The mixture was heated to dissolve the anhydride and cooled to room temperature. Then 20.25 lbs. of styrene containing 13.8 g. of benzoyl peroxide was added along with 23 ml. of polyvinyl alcohol solution. The reaction mixture was heated and polymerized using the following cycle: 0.5 hour to 90° C. at 0.9 p.s.i.g.; 3.5 hour at 90° C. and 9.0–7.0 p.s.i.g.; 7 hours at 92° C. and 7.0–5.0 p.s.i.g.; 0.5 hour at 92–110° C. and 5–16 p.s.i.g.; 6.0 hours at 110° C. and 6–14 p.s.i.g.; 0.5 hour at 110–130° C. and 14.0–35 p.s.i.g. Polyvinyl alcohol solution (720 ml. 5% was added incrementally during the 3–8 hour reaction period. Additional catalyst, tertiary butyl perbenzoate (6.9 g. in 25 ml. styrene) was added at 7.75 hour reaction time. At hourly intervals, samples were removed and the methyl half acid content of the polymer determined (see Table I). There was produced 20.62 lbs. of bead product.

TABLE I.—METHYL HALF ACID CONTENT OF SAMPLES FROM EXAMPLES V, VI AND VII

[Weight percent]

| Time (hours): | Example V | Example VI | Example VII |
|---|---|---|---|
| 1 |  | 5.0 | 5.8 |
| 2 | 5.4 | 4.8 | 5.3 |
| 3 | 5.2 | 4.8 | 5.2 |
| 4 | 5.0 | 4.8 | 5.1 |
| 5 | 5.1 | 4.8 | 5.0 |
| 6 | 5.0 | 4.8 | 5.0 |
| 7 | 5.1 | 4.7 | 4.0 |
| 8 | 5.0 | 4.8 | 5.1 |
| 9 | 5.1 | 4.8 | 5.1 |
| 10 | 5.1 | 4.8 | 5.3 |
| 11 | 5.3 | 5.1 | 5.5 |
| 12 | 5.8 | 5.6 | 6.2 |
| 13 | 6.0 |  |  |
| 13.5 |  | 5.9 |  |
| 14.5 | 6.1 |  |  |
| 15 |  |  | 6.3 |
| 15.5 |  | 6.1 |  |
| 16 | 6.1 |  |  |
| 17 |  |  | 6.4 |
| 17.5 | 6.2 | 6.1 | 6.4 |
| 18 | 6.1 | 6.1 |  |
| 23 |  |  | 6.3 |

Thus, the examples show how homogeneous copolymers may be produced according to the invention, and the feasibility of recycling the aqueous filtrate with proper up-grading with additional reactants to give comparable products.

EXAMPLE VIII

The half acid copolymers from Examples V, VI, and VII were cyclized to anhydride copolymers by heating at 200° C. for 2–3 hours in a vacuum oven. The physical properties of these polymers are listed in Table II.

TABLE II.—PHYSICAL PROPERTIES OF STYRENE (S)-MALEIC ANHYDRIDE (MA) COPOLYMERS DERIVED BY CYCLIZATION AT 200° C. OF STYRENE-METHYL (MHA) HALF ACID COPOLYMERS

| Experiment | Wt. percent MA | | $\eta_{inh.}$ | $\overline{M}n \times 10^{-3}$ | Tg° C. | | Heat Distortion (° F.) | |
|---|---|---|---|---|---|---|---|---|
| | Crude | Purified | | | Crude | Purified | ⅛" bar | ½" bar |
| V | 5.0 | 4.8 | 0.57 | 143 | | 112 | 214.5 | 222.5 |
| VI | 4.5 | 4.5 | 0.57 | 157 | 113 | 113 | 212.5 | 219.6 |
| VII | 4.8 | 4.5 | 0.69 | 165 | 113 | 112.5 | 212.2 | 221.9 |

| Experiment | Izod impact, ft. lb./in. | Tensile strength, p.s.i. | modulus× $10^{-3}$ | Percent at break | Max. fiber, stress p.s.i. | Flexural modulus× $10^{-3}$, p.s.i. | Max. strain in./in. |
|---|---|---|---|---|---|---|---|
| V | 0.33 | 6,635 | 492 | 1.45 | 10,896 | 369 | 0.0269 |
| VI | 0.39 | 6,702 | 543 | 1.93 | 10,833 | 475 | 0.0237 |
| VII | 0.41 | 6,527 | 526 | 1.32 | 11,865 | 458 | 0.0275 |

The $\eta_{inh.}$ and $\overline{M}n$ were determined on purified samples. All other test specimens were prepared from the "crude" anhydride. The ⅛" heat distortion bars and izod impact test specimens were compression molded. All other test specimens were injection molded.

EXAMLE IX

To a 2-liter resin kettle equipped with a nitrogen purge, stirrer, reflux condenser, thermometer, and addition funnel, there were initially charged 73.5 g. (0.75 mole) maleic anhydride and 37.02 g. (0.5 mole) of n-butanol. The mixture was gently heated for about 25 minutes. The heat source was removed and 600 g. of water added. The mixture was then stirred for about 30 minutes. An aliquot of the clear homogeneous solution was removed and titrated. The solution was shown to require 1420 meqs. of base for complete neutralization. Styrene, 480 g. (containing 0.96 g. benzoyl peroxide) and 1.0 ml. of 5% aqueous polyvinyl alcohol solution were then added and the reaction mixture was heated from 31° C. to 80° C. during about 30 minutes and then to reflux, 93° C., during another 30-minute period. The reaction temperature throughout the remaining course of the reaction (22 hours) was 93° to 95° C. An additional 1.4 ml. of 5% polyvinyl alcohol solution was added incrementally during the 2 to 7.5 hour period of the reaction. Two portions of additional benzoyl peroxide (0.38 g. each) was added at 5.5 and 9.5 hours of reaction time. Samples of the reaction mixture were removed at 1.5, 2.5, 4.5, 6.5, 8.5, 11.5, and 13.5 hours of the reaction period. These samples were coagulated in methanol, the polymer removed and dissolved in methyl ethyl ketone and precipitated into methanol. The dried polymer samples were titrated and the meq. of base per gram of polymer determined. The data are listed in Table III. After completion of the reaction, the fine beads were recovered by filtration and dried to give 454 grams of product. Infra-red analysis of the samples removed at the various intervals of time as well as the analysis of the final product showed the n-butyl hydrogen maleate had been incorporated into the product. The infra-red analysis and titrimetric data indicated that a small amount of diacid was incorporated into the product. Portions of all of the samples were cyclized completely to the anhydride copolymer. The anhydride content of the various samples were determined and are listed in Table III.

Two hundred grams of the final half acid product were cyclized by heating several hours at 200° C. and at 0.5 millimeter mercury pressure, to give 187.8 grams of anhydride copolymer having a maleic anhydride content of 5.4 weight percent. The cyclized product had a glass transition temperature (Tg) of 114.5° C. and an HDT of 213° F. (⅛" bar). Thirty-five grams of the crude anhydride product were dissolved in methyl ethyl ketone and filtered to remove trace amounts of insolubles. The filtrate was precipitated into methanol and the polymer filtered and dried to give 34.2 grams of anhydride copolymer having a maleic anhydride content of 5.2 weight percent, Tg=115° C., $\eta_{inh.}$=0.47, and $\overline{M}n$=92,000.

EXAMPLE X

The process of Example IX was repeated except that water was added to the maleic anhydride to completely dissolve the same (forming maleic acid) before the addition of butanol. The resin kettle was charged with 73.5 g. (0.75 mole) maleic anhydride and 600 g. water and the mixture stirred for ca. 1 hour to form a solution. An aliquot titrated to show that 1491 meqs. of base would be needed for neutralization. Then, 37.02 g. (0.5 mole) of n-butanol was added and the mixture stirred and warmed from 29° C. to 40° C. (0.5 hour). An aliquot was titrated and showed that 1497 meqs. of based would be required for neutralization. Then 480 g. styrene containing 0.96 g. of benzoyl peroxide and 1.0 ml. of 5% polyvinyl alcohol solution were added and the polymerization carried out as in Example IX. Titration of the product, recovered at intervals of time, showed that the acid content increased with increased reaction time. The data are listed in Table III and are compared with the data obtained for Example IX. The yield of final product, fine beads, was 445 g.

TABLE III

| Time, hours | Acid product, meqs./grams polymer | | Cyclized product MA content (wt. percent) | |
|---|---|---|---|---|
| | Example IX | Example X | Example IX | Example X |
| 1.5 | 0.546 | 0.294 | 5.0 | 2.3 |
| 2.5 | 0.525 | 0.326 | 4.8 | 2.7 |
| 4.5 | 0.504 | 0.385 | 4.6 | 3.3 |
| 6.5 | 0.512 | 0.424 | 4.7 | 3.8 |
| 8.5 | 0.540 | 0.488 | 4.8 | 4.1 |
| 11.5 | 0.571 | 0.525 | 5.0 | 4.5 |
| 13.5 | 0.621 | 0.608 | 5.0 | 4.6 |
| 22.5 | 0.561 | 0.515 | 5.0 | 4.6 |

Example X thus illustrates that the product obtained by commencing polymerization before sufficient half ester is formed results in a non homogeneous product, while Example IX illustrates that a homogeneous product may be readily obtained.

EXAMPLE XI

The procedure of Example X was repeated except that no samples were removed during the polymerization. The product was 519 g. of fine beads. The Tg of the sample thereof was 109° C. Two hundred grams of this product was cyclized to give 190.1 g. of anhydride copolymer with a maleic anhydride content of 5.0 weight percent and a Tg of 110.5° C. Purified product had a maleic anhydride content of 4.9%; $\eta_{inh}$=0.49; Tg=114° C. and $\overline{M}n$=98,000. Molded specimens of the cyclized copolymer were transparent.

EXAMPLE XII

The procedure of Example IX was repeated except that the maleic anhydride used was increased to 98 g. (1.0 mole) and samples were not removed at the various intervals of time. The initial aqueous solution was shown to require 1922 meqs. of base for neutralization, prior to the addition of styrene and catalyst. A total of 12 ml. of 5% aqueous polyvinyl alcohol solution was used to maintain the suspension. The weight loss of material prior to work-up was 5 grams. The beads were filtered to give 567 g. of filtrate (titration of an aliquot showing 1.93 meqs. of base per gram of filtrate would be necessary for neutralization). The beads were washed twice with portions of hot water (the washes required 72 and 10 meqs. of base respectively). The beads were then repeatedly washed with additional water and then with methanol and dried to give 537 g. of styrene-half acid copolymer. The glass temperature of the styrene-half acid copolymer was 111.5° C. Two hundred grams of the styrene half acid copolymer were cyclized by heating at 200° C., 0.5 mm. mercury pressure for several hours to give 187.7 g. of styrene-anhydride copolymer. The cyclized copolymer contained 6.6 weight percent maleic anhydride. The properties of the cyclized polymer were $Tg=115°$ C., and HDT=216° F. (⅛" bar). A sample of the crude anhydride was purified and the purified product was shown to contain 6.5 weight percent maleic anhydride. The properties of this purified product were $\eta_{inh}=0.55$; $Tg=116°$ C., and $\overline{Mn}=106,000$.

EXAMPLE XIII

The filtrate of Example XII stood for about two months at room temperature. An aliquot of this filtrate was titrated and required 1.89 meqs. per gram of filtrate for neutralization. A sample, 10.25 g. of the filtrate upon careful removal of solvent left a residue of 1.10 g. The infrared spectrum of this residue showed it to be predominately maleic acid. A sample of this solid (0.129 g.) was titrated and required 2.14 meqs. of base (theoretical for maleic acid equal 2.92 meqs.). Thus, 552 of this filtrate was estimated to contain approximately 0.52 mole of maleic acid. To bring the initial anhydride (or derived acid) to the concentration of the preceding Example XII, would require 0.48 mole of maleic anhydride. The initial butyl half acid concentration in Example XII was estimated to be 78 meqs. or 0.078 mole (13.42 g.). To a 2-liter resin kettle, there was charged 39.3 g. (0.40 mole) maleic anhydride and 100 g. water and the mixture stirred for 5 minutes. Then the 552 g. of above filtrate from Example XII was added and the mixture stirred for 15 minutes until all the maleic anhydride was dissolved. Normal butanol 31.22 g. was added and the mixture stirred for 10 minutes. Finally 13.42 g. of n-butyl hydrogen maleate was added with an additional 30 minutes stirring. The solution was completely homogeneous. The total weight of the reagents was 735 g. A titration of an aliquot showed that 1919 meqs. of base would be required for neutralization (comparable to the 1922 meqs. required in Example XII). Styrene, 480 g. containing 0.96 g. benzoyl peroxide was added and the reaction carried out following the procedure of Example XII. A sample of the reaction mixture was removed at 1.5 and 3.5 hours and the styrene-half acid polymer isolated as described in Example IX. Only 3 ml. of 5% polyvinyl alcohol solution was required to maintain a successful suspension. The total reaction time was 15.5 hours and the weight loss of material prior to work up was 12 g. The reaction mixture was filtered to give 555 g. of filtrate and 515 g. of fine bead product after washing and drying. The Tg for a precipitated sample of the acid polymer was 113° C. Titration of the filtrate (aqueous phase) showed it would require 1.91 meqs. of base per gram of filtrate for neutralization. The samples taken at 1.5 hour and 3.5 hour reaction times were cyclized as in Example XII. The anhydride content of the crude anhydride copolymer samples were respectively 5.6 and 5.7 weight percent. Two hundred grams of the final bead product were cyclized to give 187.1 g. of crude anhydride copolymer having a maleic anhydride content of 7.0 weight percent, $Tg=116°$ C. and an HDT of 220° F. (⅛" bar). A purified sample of the anhydride copolymer had an anhydride content of 6.9 weight percent and a $Tg=115°$ C.; $\eta_{inh}=0.46$; and $\overline{Mn}=86,000$.

EXAMPLE XIV

The 552 g. of aqueous filtrate from Example XIII was shown to require 1057 meqs. of base for neutralization. This corresponds to a maleic acid content of 0.53 mole. Hence, 0.47 mole of acid (derived from n-butyl hydrogen maleate and maleic anhydride) is required to maintain one mole. To a two-liter kettle, there was thus charged 37.4 g. (0.38 mole) of maleic anhydride and 100 ml. water. To this was added the 552 g. of filtrate above described. The mixture was stirred until all the maleic anhydride had dissolved. Then, n-butanol 30.34 g. (0.41 mole) was added followed by 15.5 g. (0.09 mole) of n-butyl hydrogen maleate and the mixture stirred to give a homogeneous mixture. The total weight of the reaction mixture was 735 g. Titration of an aliquot showed that 1911 meqs. of base would be required for neutralization. Then styrene (480 g.) containing 0.96 g. benzoyl peroxide, was added and the polymerization carried out as in Example XIII, except that only 3 ml. of 5% aqueous polyvinyl alcohol solution was required for suspension. The weight loss of material prior to work up was 6 g. The reaction mixture was filtered to give 567 g. of filtrate and the 520 g. of fine beads. The acid copolymer had a Tg of 115° C.

Samples taken after 1.5 and 3.5 hours reaction time were cyclized and were found to contain 6.2 and 6.4 weight percent respectively of maleic anhydride. Two-hundred g. of bead product were cyclized to give 185.3 g. of copolymer with a maleic anhydride content of 7.5 weight percent, $Tg=117.5°$ C. and an Hg=222° F. (⅛" bar). Purified cyclized product had a maleic anhydride content of 7.5%, a $Tg=115°$ C.; $\eta_{inh}=0.46$; and $\overline{Mn}=84,000$.

EXAMPLE XV

Maleic anhydride 91.1 g. (0.92 mole), and 600 g. of distilled water were charged to a resin kettle and stirred until a solution formed. Then 31.22 g. (0.42 mole) n-butanol was added and stirred for 10 minutes. Next, 13.42 g. (0.08 mole) of n-butyl hydrogen maleate was added. The homogeneous solution was stirred 0.5 hour. An aliquot, titrated, showed 1928 meqs. of base needed for neutralization. Styrene 480 g., containing 0.96 g. benzoyl peroxide was added and the reaction mixture heated and polymerized as in Example X. Total reaction time was 15.5 hours and 7 ml. of 5% polyvinyl alcohol solution were used. Samples were removed at 1.5 and 3.5 hour reaction time. The 517 g. of product, fine beads, had a Tg of 112° C. There was recovered 573 g. of filtrate.

The 1.5 and 3.5 hour samples were cyclized and shown to have a maleic anhydride content of 5.1 and 5.3 weight percent respectively. Two hundred grams of the bead product were cyclized to give 187.0 g. of anhydride copolymer having a maleic anhydride content of 6.5 weight percent, $Tg=119°$ C. and an HDT=215° F. (⅛" bar). Purified cyclized product had 6.4 weight percent maleic anhydride, with $\eta_{inh}=0.51$; $Tg=114.5°$ C.; and $\overline{Mn}=97,000$.

EXAMPLE XVI

Example XII was repeated (Experiment A) except that samples of product were removed at intervals of time and cyclized to anhydride copolymers. This was done to illustrate the homogeneity of the product obtained.

A second experiment (Experiment B) was carried out in the same manner, except that the initial half acid content was considerably increased. This was accomplished by allowing the maleic anhydride and n-butanol to react for a longer period of time (14 hours at room temperature). The data from these experiments are tabulated in Table IV.

TABLE IV

| Experiment | Base for initial aqueous solution, meqs./gram | Anhydride content of cyclized smples | | | | | | |
|---|---|---|---|---|---|---|---|---|
| | | Time, hours | | | | | | |
| | | 1.5 | 2.5 | 4.5 | 5.5 | 8.5 | 13.5 | Final |
| A | 2.61 | 4.9 | 5.1 | 5.2 | | 5.8 | 6.1 | 6.3 |
| B | 2.23 | 14.8 | 12.3 | | 9.6 | | | 8.1 |

The data illustrates that in Experiment A a relatively homogeneous polymer was produced, whereas in Experiment B, where a high half acid concentration was intially present, a non-homogeneous product was produced. It should be also noted that in Experiment B, a higher half acid content was incorporated into the copolymer in the early stages of the polymerization and that as the polymerization progressed, the amount of half acid incorporated was decreased.

EXAMPLE XVII

A series of experiments were carried out to show the effect of varying the concentrations of the maleic anhydride and n-butanol content in the polymerization recipe. Maleic anhydride and n-butanol were initially added to a reaction vessel, warmed gently for about 25 minutes to form some half acid, and the heat removed, 600 parts by weight of water added, and the solution stirred for 20–25 minutes. Then there was added 480 parts by weight of styrene containing 0.2 weight percent, based on the styrene, of benzoyl peroxide. The reaction mixture was heated to reflux (92–94° C.) during 30–40 minutes and the copolymerization allowed to go to completion. During the reaction, after 5 hours and 9 hours, two portions of additional benzoyl peroxide each 0.08 weight percent, based on styrene, were added. Also added intermittently during the reaction was the suspending agent, 10–13 ml. of a 5% aqueous polyvinyl alcohol solution (Elvanol 50–42). The products were recovered by filtration and consisted of fine beads. The products were cyclized to the anhydride by heating in a vacuum oven at 200° C. for about 3 hours and the anhydride content noted in Table V.

The data shows that by varying either the maleic anhydride or the butanol concentration, varying amounts of acid content (and hence maleic anhydride by cyclization) are incorporated into the final homogeneous copolymer.

TABLE V

| Experiment: | Maleic anhydride, parts by weight | n-Butanol, parts by weight | Reaction time, hours | Maleic anhydride content, wt. percent, cyclized copolymer | $T_g$, °C. |
|---|---|---|---|---|---|
| 1 [1] | 49 | 37 | 22 | 3.7 | 111 |
| 2 [1] | 73.5 | 37 | 22 | 5.2 | 115 |
| 3 [1] | 98 | 37 | 22 | 6.5 | 116 |
| 4 [1] | 120 | 37 | 24 | 7.5 | 118.5 |
| 4 [2] | 120 | 37 | 24 | 7.5 | 118.5 |
| 5 [2] | 120 | 59 | 22 | 9.5 | 123.5 |
| 6 [2] | 120 | 74 | 15 | 10.6 | 126 |
| 1 [3] | 49 | 37 | 22 | 3.7 | 111 |
| 7 [3] | 98 | 74 | 15 | 8.7 | 120.5 |
| 8 [3] | 147 | 74 | 15 | 12.3 | 130 |
| 9 [3] | 147 | 90.6 | 15 | 13.0 | 131 |

[1] Increased maleic anhydride content.
[2] Increased n-Butanol content.
[3] Increased MA and n-Butanol.

EXAMPLE XVIII

Experiment No. 5 of Table V was repeated (Experiment A) except that the amount of water was reduced from 600 parts to 500 parts by weight (Experiment B). Samples of the product were removed at various intervals of time and cyclized to anhydride copolymer. The resulting data is listed in Table VI.

This data shows that by varying the water content, and thus the concentration of half acid present, the amount of acid content incorporated into the copolymer is varied.

TABLE VI

| Experiment | Base for initial aqueous solution, mdqs./grams | Anhydride content (wt. percent) of cyclized samples (time, hours) | | | | Final product, $T_g$ (° C.) |
|---|---|---|---|---|---|---|
| | | 1.5 | 2.5 | 3.5 | 15 | |
| A | 3.00 | 7.8 | 7.8 | | 9.5 | 123.5 |
| B | 3.23 | 11.5 | | 10.5 | 10.2 | 125 |

EXAMPLE XIX

To 3,000 g. of distilled water was added 185.1 g. (2.5 mole) of n-butanol with thorough mixing. Then, 490.0 g. (5.0 mole) of maleic anhydride was dissolved in the water-butanol solution (Mixture A). After 2 hours, an aliquot of Mixture A was titrated and was shown to require 9868 meqs. of base for complete neutralization (corresponding to 0.132 moles of half ester in Mixture A). To a 5-liter resin kettle, equipped with a nitrogen purge, stirrer, reflux condenser and addition funnel, there was charged 2,000 g. styrene (containing 4.0 g. benzoyl peroxide and 2.0 g. cumyl peroxide) and 3062.6 g. of Mixture A. The mixture was stirred for 8 hours. Aqueous Gantrez AN–169 solution (5%, 40 ml.) was added and the stirred reaction mixture heated from 28–68° C. during 2 hours; 68–70° C. for 3.5 hours; 70–80° C. during 0.5 hour; at 80° C. for 2.5 hours; 80–90° C. during 0.33 hour; at 90° C. for 5 hours; 90–96.5° C. during 0.25 hour and 0.5 hour at 96.5° C. Samples of the reaction mixture were removed at 5 hours and 8 hours reaction time and the polymer product isolated. Conversion was 10% at 5 hours (Product A) and 29% at 8 hours (Product B) reaction time. Additional benzoyl peroxide was added at 10.5 hours (1.0 g.) and at 12 hours (0.5 g.). Additional suspending agent, 20 ml. of 5% aqueous polyvinyl alcohol solution was added at 10.7 hours. The bead product was filtered, washed with hot water, methanol, and dried to give about 2100 grams product (Product C). Infra-red spectra of the final product (C) and the products obtained at 10 and 29% conversion (A and B) showed that the acid content of the three products were all very similar and slightly greater in the final product. The products (A, B, and C) were cyclized at 200° C. The anhydride content of A was 5.3%, B was 5.4% and S was 6.1%. The final product, C, cyclized had a $T_g$ of 113° C. A purified sample of cyclized Product C had a $T_g$ of 115° C., $\eta_{inh}=0.42$, and $\overline{M_n}=102,000$.

EXAMPLE XX

To a 12 oz. crown-cap bottle was charged 8.0 g. (0.055 mole) of ethyl hydrogen maleate, 72 g. (0.691 mole) of styrene, 0.144 g. of benzoyl peroxide and 0.072 g. tert.-butyl perbenzoate followed by 120 ml. of distilled water containing 0.3 g. of Elvanol 50–42. The bottle was capped and heated in a tumbling, rotating oil bath for the following cycle: 1 hr. at 25–90° C.; 3.5 hrs. at 90° C.; 0.08 hr. at 90–92° C.; 4.75 hrs. at 92° C.; and 6.25 hrs. at 92–115° C. On cooling, fine spherical beads were obtained which were filtered and dried (70.2 g.). Infrared analysis showed the product to contain both ester and acid carboxyl groups, establishing the presence of half acid in the product. A sample of the product was cyclized at 200° C. and was shown to contain about one mole percent of maleic anhydride.

EXAMPLE XXI

To 8.0 g. (0.082 mole) of maleic anhydride, 72 g. 0.691 mole) of styrene, 0.144 g. of benzoyl peroxide, and 0.072 g. of tert-butyl perbenzoate in a 12 oz. crown-cap bottle was added 120 ml. of distilled water containing 0.3 g. of Elvanol 50–42. The bottle was capped and heated as in Example XX. The bead product obtained (72.0 g.) showed only a trace amount of acid carboxyl by infrared analysis, establishing that the polymerization of styrene and maleic anhydride in the absence of an alcohol will not produce copolymers.

EXAMPLE XXII

To a 12 oz. crown-cap bottle containing 8.0 g. (0.082 mole) of maleic anhydride, 3.76 g. (0.082 mole) of ethanol, 72 g. (0.691 mole) of styrene, 0.144 g. of benzoyl peroxide and 0.72 g. of tert-butyl perbenzoate there was added 120 ml. of water containing 0.3 g. Elvanol 50–42. The bottle was heated as in Example XX. The bead product obtained (72 g.) analyzed by infra-red spectometry, contained about 0.5 mole percent of ethyl half acid in the copolymer.

EXAMPLE XXIII

Example XXII was repeated except that two equivalents of ethanol (7.52 g., 0.163 mole) were used. The product, 73.7 g. of beads, was analyzed by infra-red and showed a larger ethyl half acid content (ca. 1%) than the product of Example XXII.

EXAMPLE XXIV

Example XXII was repeated except that four equivalents of ethanol (15.04 g., 0.326 mole) were used. The bead product, 75.3 g. analyzed by infra-red, showed a greater ethyl half acid content than the product of Example XXIII. A sample of the bead product was heated for 30 minutes at about 225° C. The resulting material was analyzed by infra-red and showed the absence of ethyl half ester and showed the absorptions typical of a styrene-maleic anhydride copolymer. The anhydride content was found to be 2.5 weight percent when analyzed by non-aqueous titration.

EXAMPLE XXV

Examples XXII, XVIII, and XXIV were repeated except that isopropanol was used in place of ethanol. The results were:

| Experiment | Amount of Isopropanol | | | Bead product, grams | Isopropyl half ester in product, I.R. analysis |
|---|---|---|---|---|---|
| | Grams | Moles | Equivalents | | |
| A | 4.91 | 0.082 | 1 | 71.7 | Yes. |
| B | 9.82 | 0.163 | 2 | 75.0 | >A. |
| C | 19.64 | 0.326 | 4 | 73.1 | >B. |

Substitution of t-butanol for isopropanol in this example gave polymeric material containing no half ester component.

A sample of the product from C was heated for 30 minutes at 225° C. Analysis of the heated material by infra-red showed the absence of isopropyl half ester and showed the absorptions typical of a styrene-maleic anhydride copolymer. The anhydride content was found to be 2.7 weight percent by non-aqueous titration.

EXAMPLE XXVI

To a 12 oz. crown-cap bottle, there was added 8.0 g. (0.067 mole) of methyl hydrogen maleate, 72 g. (0.691 mole) of styrene, 0.15 g. of benzoyl peroxide, 0.074 g. of tert-butyl perbenzoate, and 120 ml. of distilled water containing 0.20 g. of Elvanol 50–42. The bottle was capped and heated in a rotating, tumbling oil bath for the following cycle: 7 hours at 90° C.; 0.5 hour at 90–115° C.; and 8.5 hours at 115° C. The cooled reaction mixture was filtered to give 72 g. of a bead product. Analysis of the product showed it to contain both ester carbonyl and acid carbonyl groups. A sample of the copolymer, heated at 225° C. for 40 minutes, showed the absence of acid groups and showed the absorption typical of a styrene-maleic anhydride copolymer containing about 0.5% maleic anhydride.

EXAMPLE XXVII

To a 12 oz. crown-cap bottle was added 20 g. (0.204 mole) of maleic anhydride, 10.47 g. (0.327 mole) of methanol, 80 g. (0.77 mole) of styrene, 0.12 g. of benzoyl peroxide, 0.06 g. of t-butyl perbenzoate and 100 ml. of water containing 0.3 g. Elvanol 50–42. The bottle was capped and heated in a rotating, tumbling oil bath using the following heating cycle: 3.5 hours at 90° C.; 7.0 hours at 92° C.; 0.5 hour at 92–110° C.; 6.0 hours at 110° C.; 0.5 hour at 110–130° C. and 5.0 hours at 130° C. After cooling, the product was filtered, washed with water, washed with methanol and air dried to give 86.4 g. of beads. Infra-red analysis showed the product to contain methyl hydrogen maleate. Forty grams of the product were heated for ca. 5 hours at 220° C. and 0.6 mm. mercury pressure in a vacuum oven. The heated product, after cooling, was dissolved in methyl ethyl ketone, filtered and precipitated by addition to methanol, filtered and dried for 13 hours at 72° C./0.6 mm. to give 37 grams of product. Infra-red analysis of this cyclized product showed the complete absence of any acid carbonyl groups and showed the absorptions typical of a styrene-maleic anhydride copolymer.

A very weak ester absorption indicated a small amount of diester had been incorporated in the polymer. The anhydride content of the polymer was found to be 5.0 weight percent. The polymer had a $\overline{M}n$ of 160,000 and an HDT of 215° F. (⅛″ bar). This HDT is significantly higher than that of conventional polystyrene which is about 181° F. (⅛″ bar).

EXAMPLE XXVIII

To a 12 oz. crown-cap bottle was added 20 g. (0.204 mole) maleic anhydride, 24.25 g. (0.327) mole n-butanol, 80 g. (0.77 mole) styrene containing 0.12 g. benzoyl peroxide and 0.06 g. tert-butyl perbenzoate, and 100 ml. water containing 0.3 g. Elvanol 50–42. The bottle was capped and the mixture polymerized following the heating cycle of Example XXVII. The bead product was filtered, washed with hot tap water and methanol and air dried to give 98.1 g. product. Infra-red analysis of the product showed a greater half-acid content than that of the product of Example XXVII. Heating of the product at 225° C. for 30 minutes in a vacuum oven cyclized most of the product, but did not cyclize the half-acid completely, so the product was heated an additional 30 minutes at 225° C. The cyclized product contained 14.7 weight percent anhydride and had the following physical properties: HDT=239° F. (⅛″ bar); $\eta_{inh}$=0.55; and an $\overline{M}n$ of 90,000.

EXAMPLE XXIX

Example XXVIII was repeated using sec-butyl alcohol (24.25 g., 0.327 mole) in place of n-butyl alcohol. A bead product, 83.2 g. was obtained. Analysis by infra-red of a sample of the product, heated for 30 minutes at 225° C., showed about 95% of the half acid content was cyclized. The anhydride content of this product was 12 weight percent.

EXAMPLE XXX

Example XXVIII was repeated except that benzyl alcohol (35.3 g., 0.327 mole) was used in place of n-butyl alcohol. The bead product, 100.3 g. analyzed by infrared, contained a half acid content comparable to that of the product of Example XXVIII. A sample, heated at 220° C./0.5 mm. for several hours was found to contain 14 weight percent anhydride. The physical properties of the cyclized product were $\eta_{inh}=0.54$; $\overline{M}n=87,000$.

EXAMPLE XXXI

Example XXVIII was repeated except that tert-amyl alcohol (29.2 g., 0.327 mole) was used in place of n-butyl alcohol. The product was a soft spongy-mass. The product was blended in a Waring Blendor in the presence of methanol to give a fibrous, fluffy solid. This fibrous material was refluxed in methanol for 1 hour and filtered to give 76.2 g. product. Infra-red analysis showed the polymeric material to contain to half ester component.

EXAMPLE XXXII

To a 12-ounce crown-cap bottle, there was added 20 g. (0.204 mole) maleic anhydride, 10.47 g. (0.327 mole) methanol, 80 g. of styrene, containing 0.12 g. benzoyl peroxide and 0.06 g. t-butyl perbenzoate, and 100 ml. of water. No external suspending agent was added with the premise that the copolymer formed would serve as a suspending agent. The bottle was capped and heated in a rotating, tumbling oil bath utilizing the following heating cycle: 1 hour 50 minutes at 50° to 90° C.; 10.5 hours at 90° C.; 0.5 hour at 90° to 112° C.; 8 hours at 112° C.; 0.5 hour at 112° to 130° C.; and 3 hours at 130° C. Following the reaction cycle, the bottle contained large flat beads of varying sizes. Most of these beads were in the range of ½ to 1½″ in length, ½ to ½″ in width and 1/16 to ¼″ in thickness. The beads were filtered, washed with water and methanol, and air dried to give 105 grams of product (occluded water present). Ninety-three grams of this crude product were heated at 200° C. and 5 mm. mercury pressure for two hours to give 75.4 grams of cyclized product. A sample was dissolved in methyl ethyl ketone and filtered to remove some insoluble material, and the filtrate precipitated into methanol. The infra-red analysis spectrum of the precipitated sample showed absorption typical of a styrene-anhydride copolymer with an anhydride content of about 5 weight percent.

EXAMPLE XXXIII

Example XXXII was repeated except that n-butanol, 24.25 g. (0.327 mole) was used in place of methanol. There were obtained large beads similar to that in Example XXXII. The anhydride content of the cyclized product was about 14 weight percent. The HDT of the cyclized product was 239.5° F. (⅛″ bar).

EXAMPLE XXXIV

The procedure of Example XXVII was followed except that 1,4-dihydroxymethyl cyclohexane, 47.16 g. (0.327 mole) was used in place of methanol. There was obtained a bead-type product, but most of the aqueous phase was absorbed therein. The beads were washed with methanol and dried to give 109 grams of product. This product was insoluble in methyl ethyl ketone and acetone, apparently being a cross-linked polymer. The above procedure also produced a cross-linked copolymer when allyl alcohol was used in place of the 1,4-dihydroxymethyl cyclohexane.

EXAMPLE XXXV

The procedure of Example XXVII was repeated except that maleic acid, 23.68 g. (0.204 mole) was used in place of maleic anhydride. Infrared analysis of the bead product showed that methyl half acid was incorporated into the product. A sample of the half acid polymer was cyclized by heating to 200° C. The anhydride content of this cyclized product was about 4.5 weight percent. Infra-red analysis showed a small amount of di-ester was incorporated in the product.

EXAMPLE XXXVI

The procedure of Example XXXV was repeated except that fumaric acid, 23.68 g. (0.204 mole) was used in place of maleic acid. Infra-red analysis of the bead product showed that methyl half acid was incorporated into the product. However, the half acid content was less than that obtained in the product of Example XXXV. The anhydride content of the cyclized product was about 2.5 weight percent. Infra-red analysis of the cyclized product showed that a trace amount of di-ester was also present in the polymer.

EXAMPLE XXXVII

The procedure of Example XXXV was repeated except that itaconic acid, 26.5 g. (0.204 mole) was used in place of maleic acid. There was produced 80 g. of fine bead product. Infra-red analysis of the product showed that half acid had been incorporated into the polymer. A sample of the polymer was heated at about 200° C. and the infra-red analysis of the heated product showed the presence of cyclic anhydride absorption. The itaconic anhydride content of the cyclized copolymer was 2.9 weight percent. The product had an $\eta_{inh}=0.55$ and an $\overline{M}n=134,000$.

EXAMPLE XXXVIII

Example XXXVII was repeated except that n-butanol, 24.25 g. (0.327 mole) was used in place of methanol. There was obtained 74 grams of fine bead product. Infra-red analysis showed that substantially more half acid was incorporated into the product than in the product of Example XXXVII. Cyclization of the material gave a cyclic anhydride copolymer in which the anhydride content was 9.1 weight percent. The cyclized product had an $\eta_{inh}=0.36$ and an $\overline{M}n=83,000$.

EXAMPLE XXXIX

A stock solution was prepared by combining 392 g. of maleic anhydride, 148.1 g. of n-butanol and 2400 g. of water. The solution was stirred for two hours and became homogeneous. The solution was allowed to stand about 20 hours. Three aliquots, A, B, and C, each 119 ml., were taken and added to crown-cap bottles. Each aliquot contained the equivalent of 16.33 g. (0.17 mole) maleic anhydride, 6.17 g. (0.08 mole) n-butanol and 100 g. water. To each bottle, there was added 80 g. (0.77 mole) styrene containing 0.29 g. benzoyl peroxide. A 5% aqueous solution of Gantrez AN–169 was added to each bottle in the following amounts: A, 1.6 ml.; B, 3.2 ml.; and C, 4.8 ml. The bottles were capped and placed in a tumbling rotating oil bath and heated using the following cycle: from 45° to 69° C. for 0.25 hour; at 69° C. for 1 hour; at 70° C. for 11 hours; 70–80° C. for 0.25 hour; at 80° C. for 13 hours; at 80–126° C. for 1 hour; and 126° C. down to 38° C. in 1.25 hour. Very fine uniform beads were produced in all three cases with bead size decreasing with increasing amounts of the suspending agent used. The beads were filtered, washed and dried to give: A, 88.7 g.; B, 87.4 g.; and C, 88.3 g. of product. The filtrates were quite clear, except that the filtrate from C which was slightly cloudy. Infra-red spectra of the three products showed them to be comparable and showed the presence of half ester in the polymer. Samples of each of the polymers were cyclized by heating at 200° C., in a vacuum for about 2 hours. The fused, cyclized products were transparent and almost colorless. Infra-red analysis of the cyclized products showed each to contain a maleic anhydride content of about 7.0 weight percent.

EXAMPLE XL

Two experiments were run according to the procedure of Example XXXIX except that a polyacrylamide was used in place of the Gantrez AN-169. The two experiments used 1.6 ml. and 3.2 ml. of a 5% aqueous solution of the polyacrylamide. Very uniform, fine beads were produced in both experiments and both filtrates were clear. The yield of half acid copolymers was 88.2 g. and 88.9 g. respectively. The half ester products and cyclized products were essentially identical to the products obtained in Example XXXIX.

What is claimed is:

1. A suspension polymerization process for the production of a non-equimolar bead copolymer having a major portion of a vinyl aryl monomer and a minor portion of a half ester of an ethylenically unsaturated dicarboxylic acid monomer, said copolymer having a predetermined amount of half ester monomer therein comprising forming a multi-phase polymerization system containing:
    (1) a vinyl aryl monomer phase;
    (2) an equilibrating aqueous phase containing a predetermined amount of a mixture of:
        (a) an ethylenically unsaturated dicarboxylic acid or anhydride;
        (b) an alcohol selected from primary and secondary alkanols having up to 6 carbon atoms, halogenated primary and secondary alkanols having up to 6 carbon atoms, aryl-alkyl alcohols, and cyclic alcohols having up to 6 carbon atoms; and
        (c) said half ester monomer;
    (3) a suspension stabilizer; and
    (4) a free radical polymerization initiator;
polymerizing said monomers at a temperature of 40–150° C. whereby, during said polymerization, said half ester monomer continuously diffuses into said vinyl aryl monomer phase and is polymerized therewith to form said copolymer, and additional said half ester monomer is continuously generated by said equilibrating mixture; and separating said bead copolymer from said system.

2. A process according to claim 1 wherein said half ester is methyl hydrogen maleate.

3. A process according to claim 1 wherein said half ester is butyl hydrogen maleate.

4. The process of claim 1 wherein said alcohol contains additional reactive groups selected from hydroxy or ethylenically unsaturated groups.

5. The process of claim 1 wherein said ethylenically unsaturated dicarboxylic acid or anhydride is maleic acid or anhydride, said alcohol is selected from methyl alcohol, ethyl alcohol, n-propyl alcohol, n-butyl alcohol and sec-butyl alcohol, and said vinyl aryl monomer is styrene.

6. The process of claim 1 wherein said ethylenically unsaturated dicarboxylic acid or anhydride is selected from maleic and itaconic acid or anhydride.

7. The process of claim 1 wherein said system, following said separation of bead copolymer is contacted with an additional member selected from the group consisting of said ethylenically unsaturated dicarboxylic monomer, half ester of said ethylenically unsaturated dicarboxylic monomer, water, aryl vinyl monomer, stabilizer, and initiator, or mixtures thereof, to form a multi-phase polymerization system comparable to that formed prior to said polymerization and repeating said polymerization.

8. A suspension polymerization process for the production of a homogeneous, non-equimolar bead copolymer having a major portion of a vinyl aryl monomer and a minor portion of a half ester of an ethylenically unsaturated dicarboxylic acid monomer, said copolymer having a predetermined amount of half ester monomer substantially homogeneously incorporated therein comprising forming a multi-phase polymerization system containing:
    (1) a vinyl aryl monomer phase;
    (2) an equilibrating aqueous phase containing a predetermined amount of a mixture of:
        (a) an ethylenically unsaturated dicarboxylic acid or anhydride;
        (b) an alcohol selected from primary or secondary alkanols having up to 6 carbon atoms, halogenated primary and secondary alkanols having up to 6 carbon atoms, aryl alkyl alcohols, and cyclic alcohols having up to 6 carbon atoms, and
        (c) said half ester monomer
said mixture containing a predetermined amount of said half ester monomer so as to provide a homogeneous product;
    (3) a suspension stabilizer and
    (4) a free radical polymerization initiator;
polymerizing said monomers at a temperature of 40–150° C. whereby during said polymerization, said half ester monomer continuously diffuses into said vinyl aryl monomer phase and is polymerized therewith to form said copolymer, and additional said half ester monomer is continuously generated by said equilibrating mixture; and separating said copolymers from said system.

9. The process of claim 7 wherein said alcohol is a primary or secondary alkanol having up to 6 carbon atoms.

10. The process of claim 7 wherein said vinyl aryl monomer is styrene and said ethylenically unsaturated dicarboxylic acid or anhydride is selected from maleic or itaconic acid or anhydride.

11. A process for preparing non-equimolar copolymers of a major portion of a vinyl aryl monomer and a minor portion of an ethylenically unsaturated dicarboxylic acid anhydride, said copolymer having a predetermined amount of said anhydride incorporated therein comprising forming a multi-phase polymerization system containing:
    (1) a vinyl aryl monomer phase;
    (2) an equilibrating aqueous phase containing a predetermined amount of a mixture of:
        (a) an ethylenically unsaturated dicarboxylic acid;
        (b) an alcohol selected from primary and secondary alkanols having up to 6 carbon atoms, halogenated primary and secondary alkanols having up to 6 carbon atoms, arylalkyl alcohols, and cyclic alcohols having up to 6 carbon atoms; and
        (c) a half ester of an ethylenically unsaturated dicarboxylic acid monomer;
    (3) a suspension stabilizer; and
    (4) a free radical polymerization initiator;
polymerizing said monomers at a temperature of 40–150° C. whereby, during said polymerization, said half ester monomer continuously diffuses into said vinyl aryl monomer phase and is polymerized therewith to form a vinyl aryl monomer-half ester bead copolymer and additional said half ester monomer is continuously generated by said equilibrating mixture; separating said vinyl aryl monomer-half ester bead copolymer from said system; and heating said vinyl aryl monomer-half ester bead copolymer whereby said half ester component of said copolymer is cyclized to form said vinyl aryl monomer-anhydride copolymer.

12. The process of claim 11 wherein said vinyl aryl monomer is styrene and said anhydride is maleic anhydride.

13. The process of claim 12 wherein said alcohol is a primary or secondary alkanol having up to 6 carbon atoms.

14. The process of claim 11 wherein said heating is at a temperature of 150–250° C.

(References on following page)

References Cited

UNITED STATES PATENTS

| | | | |
|---|---|---|---|
| 3,342,787 | 9/1967 | Muskat | 260—78.5 |
| 3,355,438 | 11/1967 | Lyons | 260—78.5 |
| 3,395,131 | 7/1968 | Fallwell | 260—78.5 |
| 3,437,643 | 4/1969 | Zimmerman | 260—78.5 |
| 3,458,484 | 7/1969 | Zimmerman et al. | 260—78.5 |

FOREIGN PATENTS 522,908  3/1956  Canada.

JOSEPH L. SCHOFER, Primary Examiner

J. KIGHT III, Assistant Examiner

U.S. Cl. X.R.

260—29.1, 31.2